(12) United States Patent
Rayman

(10) Patent No.: US 6,526,659 B2
(45) Date of Patent: Mar. 4, 2003

(54) METHOD OF CHANGING VERY LARGE TIRES

(75) Inventor: William Earl Rayman, Hartville, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/925,770

(22) Filed: Aug. 10, 2001

(65) Prior Publication Data

US 2002/0029541 A1 Mar. 14, 2002

Related U.S. Application Data

(60) Division of application No. 09/517,211, filed on Mar. 2, 2000, now Pat. No. 6,324,814, which is a continuation-in-part of application No. 09/424,087, filed on Nov. 18, 1999, now Pat. No. 6,357,498, and a continuation-in-part of application No. 09/424,089, filed on Nov. 18, 1999, now abandoned, and a continuation-in-part of application No. 09/424,276, filed on Nov. 18, 1999, now Pat. No. 6,390,165, and a continuation-in-part of application No. 09/424,275, filed on Nov. 18, 1999, now Pat. No. 6,352,090.

(51) Int. Cl.$^7$ .................................................. B23P 17/00
(52) U.S. Cl. ............................ 29/894.37; 29/402.08; 152/176; 152/188; 152/209.6
(58) Field of Search .......................... 29/894.37, 402.08; 152/209.6, 167, 169, 173, 175, 176, 185, 187, 188

(56) References Cited

U.S. PATENT DOCUMENTS

| 1,054,820 A | 3/1913 | Bowden |
| 1,494,621 A | 5/1924 | Olgivie |
| 2,609,026 A | 9/1952 | Luchsinger-Caballero |
| 2,690,253 A | 9/1954 | Francois |
| 2,990,867 A | 7/1961 | Barassi |
| 3,018,810 A | 1/1962 | Barassi |
| 3,087,526 A | 4/1963 | Barassi et al. |
| 3,107,713 A | 10/1963 | Cushman |
| 3,224,482 A | 12/1965 | Barassi et al. |
| 3,224,483 A | 12/1965 | Gross et al. |
| 3,578,052 A | 5/1971 | Petersons |
| 3,619,966 A | 11/1971 | Goldsberry |
| 3,897,814 A | 8/1975 | Grawey |

(List continued on next page.)

FOREIGN PATENT DOCUMENTS

| CA | 547958 | * 10/1957 | ................. 152/176 |
| DE | 1505157 | 7/1969 | |
| EP | 0202925 | 11/1986 | |
| EP | 0206679 | 12/1986 | |
| EP | 0251145 | 1/1988 | |
| EP | 0313500 | 4/1989 | |
| EP | 0670229 | 9/1995 | |
| FR | 540291 | 7/1922 | |
| FR | 1124766 | 10/1956 | |
| GB | 1322281 | 7/1973 | |
| GB | 2073109 | 10/1981 | |
| JP | 4-11506 | 4/1992 | |
| JP | 06320922 | 11/1994 | |
| JP | 07117419 | 5/1995 | |
| JP | 08132820 | 8/1996 | |

Primary Examiner—P. W. Echols
(74) Attorney, Agent, or Firm—Howard M. Cohn

(57) ABSTRACT

An improved method of shipping, storing, and changing very large tires having a removable tread belt mounted to a tire carcass which are typically used on very large vehicles such as earthmovers. By compressing both the tread belts and the tire carcasses, they can be shipped separately so that less shipping and storage space is required. Tire changing only requires changing the tire tread without removing the wheel or carcass from the very large vehicle making it economically feasible to store and change tread designs to accommodate a variety of very large tire/vehicle operating conditions.

7 Claims, 5 Drawing Sheets

U.S. PATENT DOCUMENTS

| | | |
|---|---|---|
| 3,942,637 A | 3/1976 | Glennie |
| 3,963,066 A | 6/1976 | Schwartz et al. |
| 3,970,493 A | 7/1976 | Grawey |
| 4,050,495 A | 9/1977 | Olsen |
| 4,071,068 A | 1/1978 | Olsen |
| 4,092,196 A | 5/1978 | Miller et al. |
| 4,150,745 A | 4/1979 | Williams et al. |
| 4,269,646 A | 5/1981 | Miller et al. |
| 4,286,644 A | 9/1981 | Pond, Jr. |
| 4,304,618 A | 12/1981 | Abbott |
| 4,351,380 A | 9/1982 | Pilliod, Jr. et al. |
| 4,474,633 A | 10/1984 | Watts |
| 4,480,670 A | 11/1984 | Payne |
| 4,609,023 A | 9/1986 | Loser |
| 4,678,084 A | 7/1987 | Maker et al. |
| 4,846,238 A | 7/1989 | Kadota et al. |
| 5,056,662 A | 10/1991 | Lasenby et al. |
| 5,236,031 A | 8/1993 | Honbo et al. |

\* cited by examiner

METHOD OF CHANGING VERY LARGE TIRES

CROSS-REFERENCE TO RELATED APPLICATIONS

This application is a divisional application of U.S. patent application Ser. No. 09/517,211, filed on Mar. 2, 2000 (now U.S. Pat. No. 6,324,814), which is a continuation-in-part of U.S. patent application Ser. Nos. 09/424,087 (now U.S. Pat. No. 6,357,498), 09/424,089 now abandoned, 09/424,276 (now U.S. Pat. No. 6,390,165) and 09/424,275 (now U.S. Pat. No. 6,352,090), all having the same inventor and a filing date of Nov. 18, 1999.

TECHNICAL FIELD OF THE INVENTION

This invention relates to methods for shipping, storing, and changing very large pneumatic tires typically for use with very large vehicles such as earthmoving vehicles, and more particularly to the methods enabled by the use of a removable tread belt pneumatic tire construction.

BACKGROUND OF THE INVENTION

The tread belt pneumatic tires which are the subject of the method of the present invention are very large tires (greater than 120 inch outside diameter (OD)) generally designed for use on very large vehicles, generally off-the-road (OTR) vehicles such as earthmovers and large-capacity mining trucks (e.g., 300 short tons or more). These very large tires and vehicles are generally utilized at long-term mining or construction sites such as rock quarries, mines, foundries, major tunnel/roadway construction, dams/dikes, and the like. The very large vehicles are generally too large to transport to the work site normally, and are therefore often shipped in pieces to the work site where the pieces are assembled/welded together for use. As modern construction vehicles have evolved to larger and larger sizes, their tires have also grown to the point where conventional shipping of the tires becomes difficult. For example, an existing design of 360 ton (32,6530 kg) truck requires pneumatic tires of 150 to 154 inch diameter (3.91 meter) which is considered to be the maximum size tire reasonably possible to ship by conventional rail or roadway means in the United States. Tire weight is another consideration, as very large tires can weigh 8,000 pounds (3,628 kg) to 15,000 pounds (6,803 kg) or more per unmounted tire. The industry would like to progress to even larger, 400 ton (362,812 kg) or 450 ton (408,163 kg) trucks with correspondingly larger tires of 160 inch (4.07 meter) diameters or more. Depending on local limitations of shipping means (such as tunnel/bridge clearances and roadway weight limits), even somewhat smaller ones of the "very large tires" may pose significant problems, and may therefore require extraordinary transport means such as by helicopter.

Another problem faced by the users of very large pneumatic tires is changing the very large tires on the very large vehicles. The very large vehicles are generally employed in areas such as rock quarries, where the tires are subjected to high stress and loads, usually under harsh environmental conditions wherein tires are subjected to puncture-producing and wear-inducing conditions. Under these conditions, tires are damaged relatively frequently and must be changed at the work site. Even with removable-flange wheels, changing very large tires is a difficult and time-consuming process, requiring as much as 5 to 6 hours for a single tire change.

Another problem is storage of the very large tires at the work site. As tires become larger, more and more space is required for storage. Also, if operating conditions are particularly harsh, or if shipping of replacement tires "on demand" is not practical, then increased numbers of spares must be stocked, further increasing the storage space needed. Furthermore, some job sites require different tread designs for different operating conditions. For example, wide treads with deep cleats may be needed for muddy conditions such as in rainy weather, versus normal-width treads with a different cleat design for operation on gravel or in dry weather conditions. Given the time consuming nature of the existing tire-changing methods, changing tires to obtain optimum tread patterns is not always feasible.

Finally, even if driving tires and steering tires on the very large vehicles are the same overall size, the tread patterns of the two types of tires need to be different for most effective operation. This again adds to the number of replacement tires which must be stored at a work site.

There is therefore a need for a method of shipping very large tires that allows for the employment of more conventional shipping means, and there is a desire to reduce the work site storage requirements as well as to improve the efficiency of the very large tire changing process.

Although tires having replaceable treads are known in automotive/motorcycle and conventional truck tire applications, it is not until recently that tread belt tires have been developed to meet the unique requirements of very large pneumatic tires for very large vehicles. U.S. patent application Ser. No. 09/424,089 entitled TIRE WITH IMPROVED REMOVEABLE TIRE TREAD BELT to Rayman, having a common assignee with the present invention, of which this invention is a continuation in part, discloses a tire with an improved removable tire tread belt for use on large earthmover vehicles. This tread belt tire (also called a "track belt tire") "is constructed of a removable tread belt assembly mounted to the outer circumferential surface of an inflatable tire carcass. A unique track belt design restrains the track from expanding while simultaneously improving the secure mounting of the track to the carcass and providing improved penetration protection. Also, the improved track belt will maintain a flatter tread profile which in turn will improve tread life and durability."

A predecessor version of removable treads or tracks for very large tires is discussed in U.S. Pat. No. 4,351,380, wherein certain prior art track belt tire assemblies comprise a plurality of ground-engaging "shoes" spaced about the periphery of the supporting structure. The heavy loads on the "shoes" result in great stresses being developed that sometimes lead to premature tire failure. The U.S. Pat. No. 4,351,380 is directed to an improved track belt assembly which comprises a plurality of shoes spaced about the periphery of a load-supporting structure and secured to a reinforcing belt structure disposed on the side of the shoe opposite the ground-engaging side thereof.

A body of prior art exists for tires with removable tread belts (see, for example, U.S. Pat. No. 3,897,814; U.S. Pat. No. 3,224,482; U.S. Pat. No. 3,087,526; and British Patent G.B. 2,073,109). However these patents were directed toward the addressing of various issues related to tires used by predominantly roadway vehicles such as automobiles and trucks. Examples of these issues include: varying cord spacing to reduce wear of the outer tread belt edge for "enhanced service life and lower manufacturing cost"; improving transverse bending for "better riding comfort and improved road holding ability"; and linking separate tread rings to improve "road-holding capabilities and . . . silent riding." Accordingly, the prior art has varied the quantity, shape, placement and spacing of tread rings, reinforcing belts, inextensible cords, and interlocking grooves in the tire carcass and tread belt, but these variations have not been adequate to address the special needs of off-the-road vehicle tires, nor of very large tires in general.

There are still unsolved problems, relating to a pneumatic tire and tread belt assembly, concerning shipping, storage, inventory, and changing of very large tires on very large vehicles.

SUMMARY OF THE INVENTION

The present invention relates to an improved method for shipping, storing, and changing very large pneumatic tires which are used on very large vehicles such as earthmover vehicles. Very large tires of conventional construction are sometimes over 13 feet (4 meters) in height and approximately 8,000 pounds (3,628 K) to 15,000 pounds (6,803 K) in weight, and proposed very large truck designs require even larger tires. The size and weight of the very large conventional tires presents significant problems in shipping, storage and tire changing.

According to the invention, the very large tires are removable tread belt tires and the tread belt is shipped separately from the tire carcass. The removable tread belt is held in a compressed state for shipping, thereby having a significantly-reduced diameter for ease of shipping.

According to an aspect of the invention, a spacer is provided for the compressed tread belt forming the tread belt into an elongated straight-sided oval shape.

According to another aspect of the invention, the tire carcass may also be held in a compressed state for shipping.

According to the invention, removable tread belt tires are used to simplify and expedite the tire changing process for very large tires on very large vehicles, thereby producing time and cost savings, as well as making it feasible to change very large tire tread designs to accommodate different operating conditions. The inventive tire changing method includes the steps of (a) leaving the tire on the vehicle but partially deflating the carcass to make the tread belt loose; (b) laterally removing the tread belt; (c) laterally moving a replacement tread belt onto the tire carcass and properly positioning it; and (d) inflating the carcass to proper pressure to hold the replacement tread belt in place on the tire carcass.

According to an aspect of the invention, the steps (b) and (c) can be accomplished by driving out of the tread belt and by driving into the replacement tread belt, respectively.

According to an aspect of the invention, the steps (b) and (c) can be directly accomplished if the very large vehicle is first positioned with the tire to be changed elevated off the ground using, for example, a pneumatic jack, and then lowering the very large vehicle after completion of step (d).

According to an aspect of the invention, step (c) includes correct positioning of the tread belt on the carcass, e.g., appropriately positioning any interlocking lands and grooves so that the tread belt is positioned on the tire carcass as designed for normal operation of the assembled tire.

According to an aspect of the invention, a tread belt may be replaced with one of like tread design, or with one having a different tread design in order to accommodate different operating conditions such as different load-bearing surface conditions or different applications of the very large vehicles.

According to the invention, removable tread belt tires are used to reduce the physical size and inventory cost of storing replacement very large tires at a work site employing very large vehicles. A small number of multi-purpose tire carcasses are stored for use as replacements of damaged carcasses, and a larger number of tread belts are stored for use as replacements for the tread belts which are approximately four times more likely to be damaged or worn out compared to the carcasses.

According to an aspect of the invention, a variety of tread belt designs are stored at the work site, thereby enabling their use on the very large vehicles to accommodate a variety of operating conditions.

According to an aspect of the invention, at least some of the tread belts are stored in a compressed state, thereby further reducing storage space requirements.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
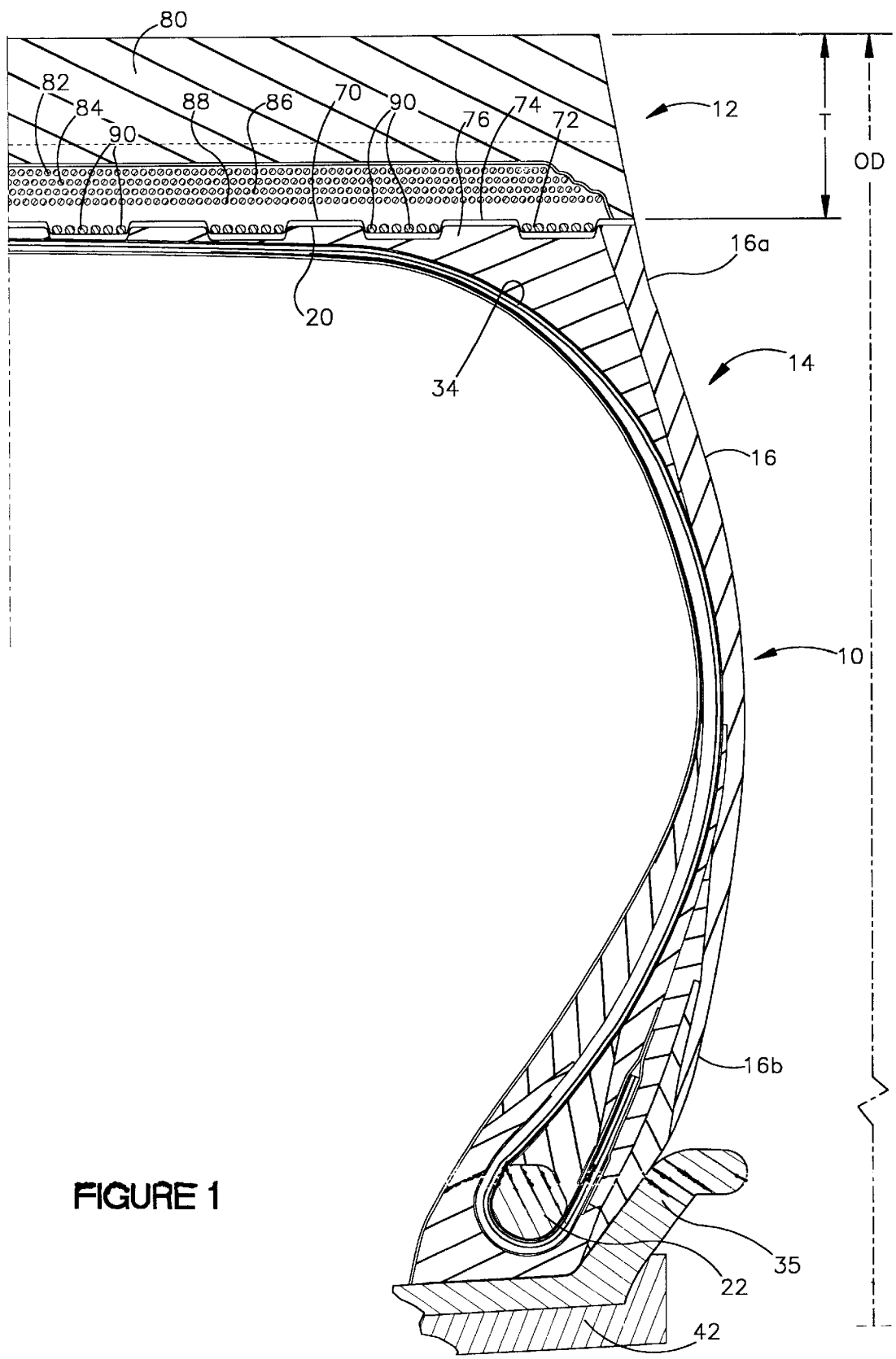

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199*a*, 199*b*, 199*c*, etc. Such relationships, if any, between similar elements in the same or different figures will become apparent throughout the specification, including, if applicable, in the claims and abstract.

Figure 2A:
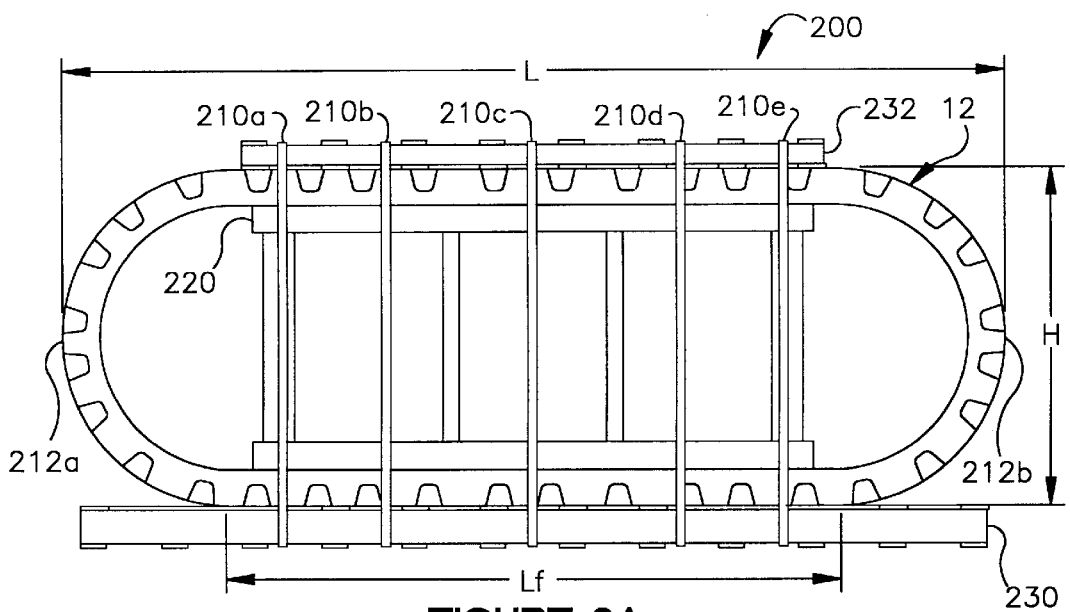
Figure 2B:
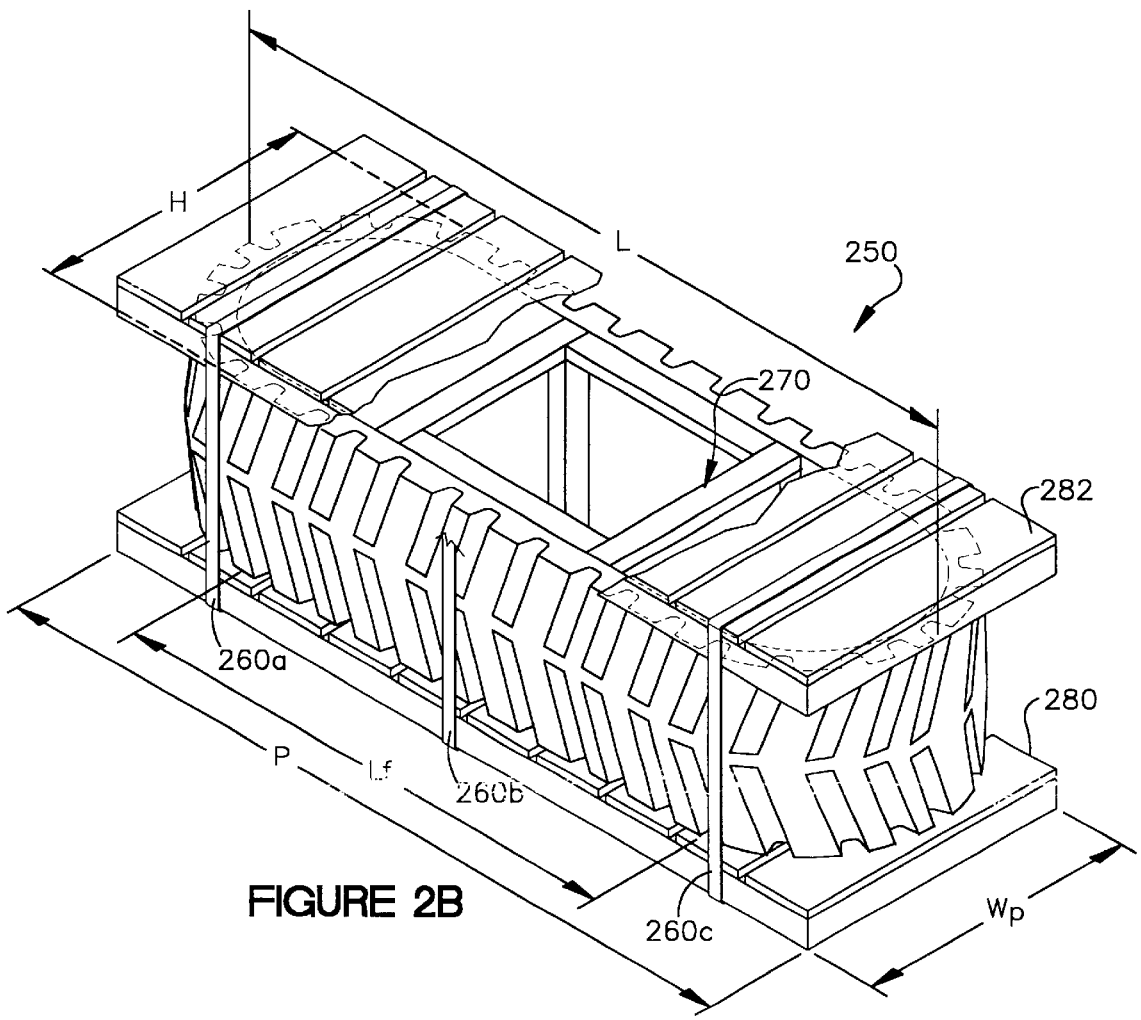
Figure 3A:
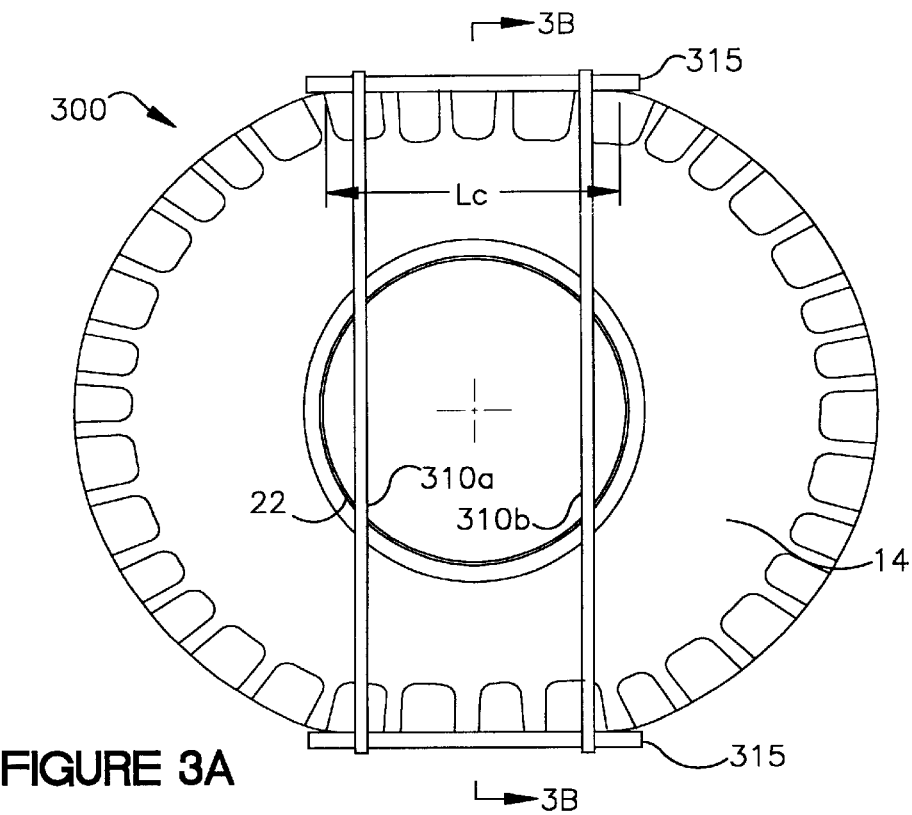
Figure 3B:
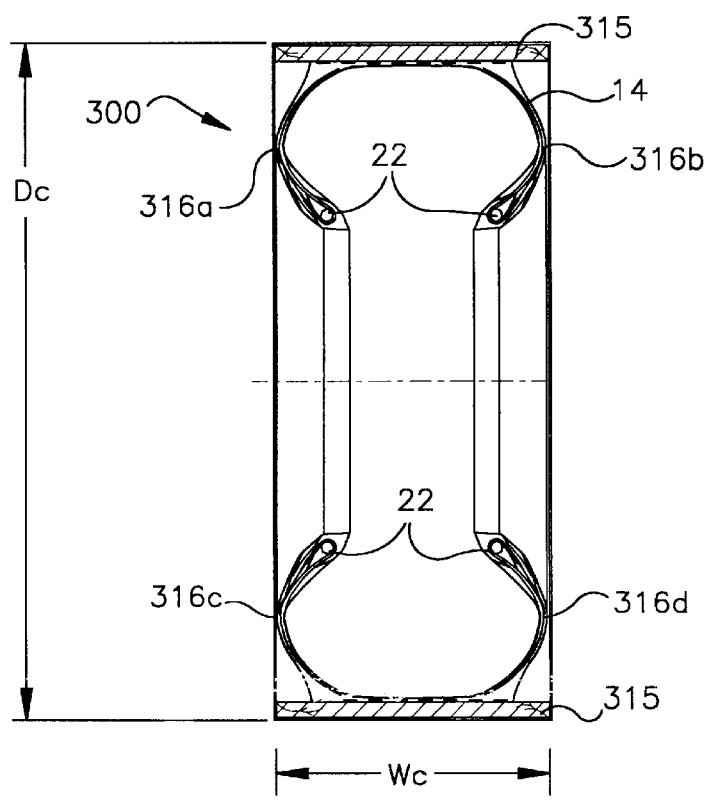
Figure 4:
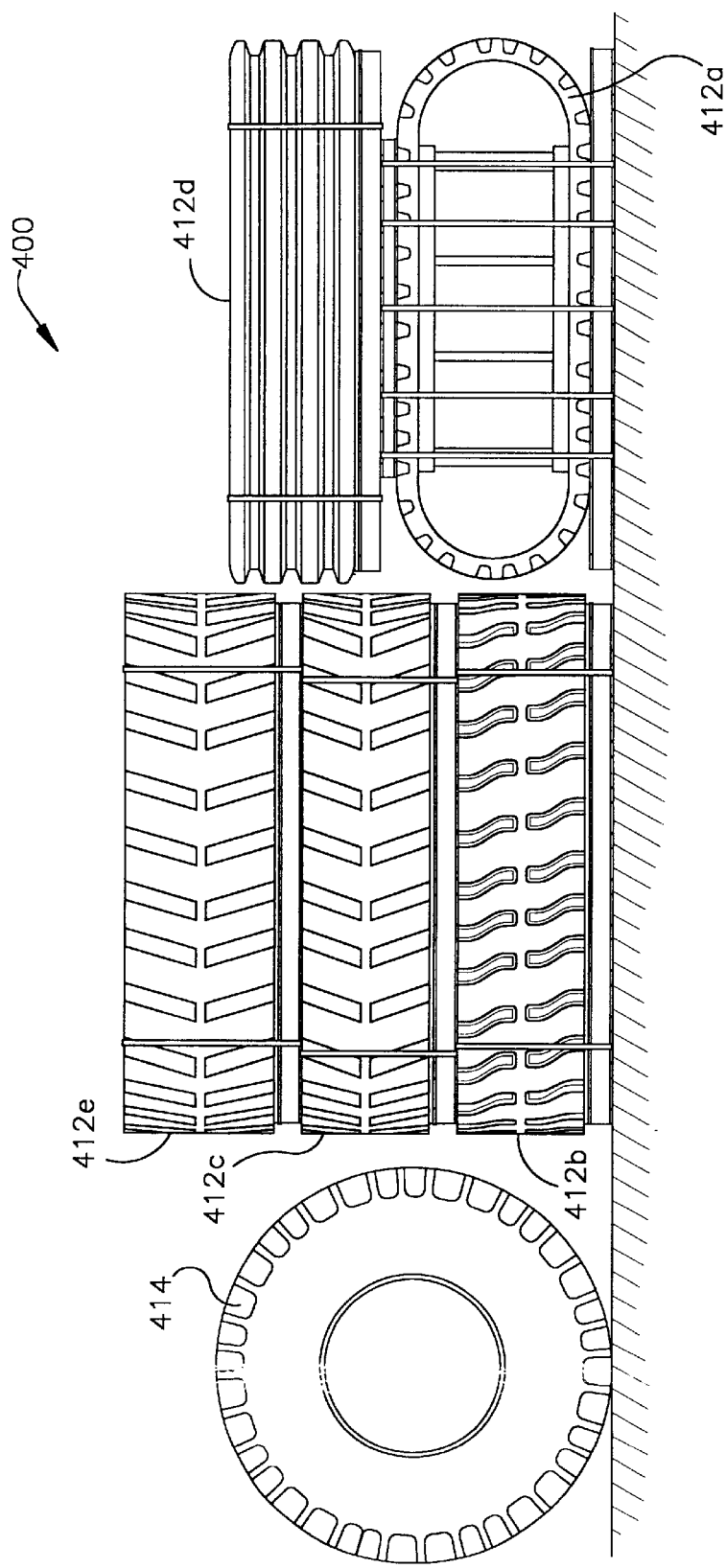
Figure 5A:
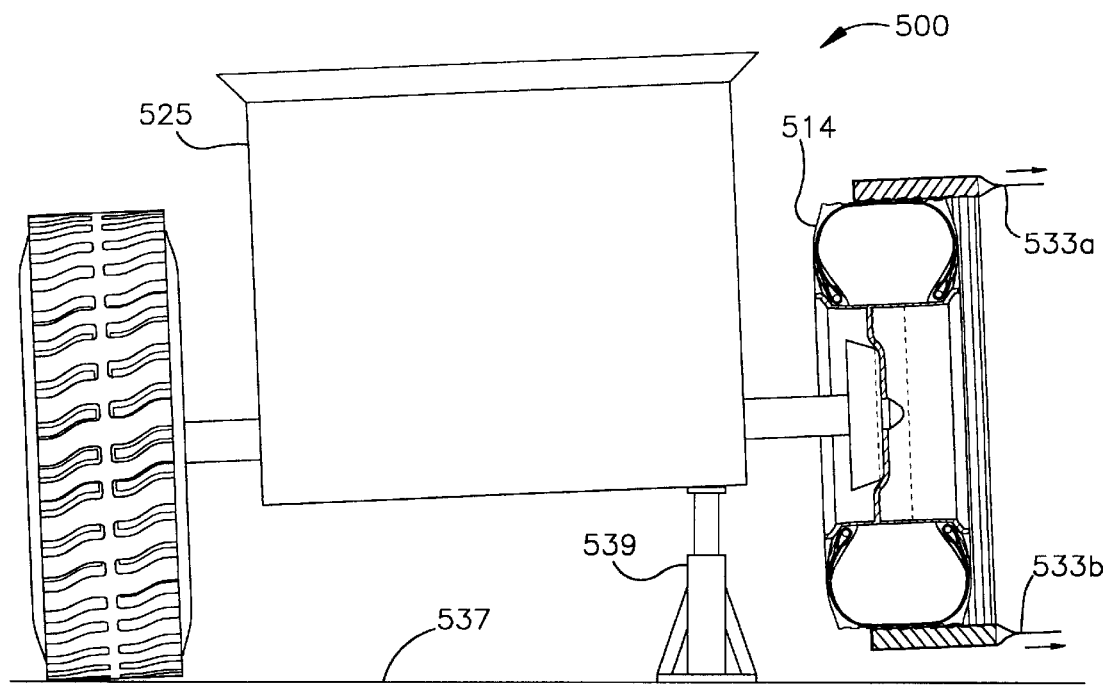
Figure 5B:
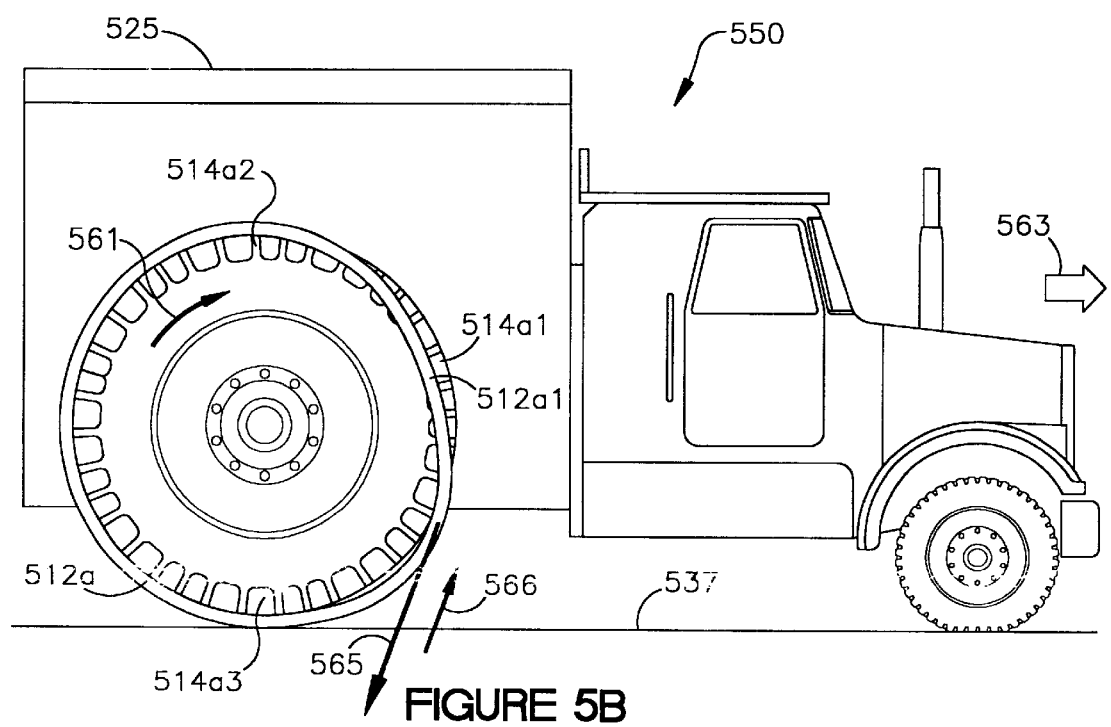

The structure, operation, and advantages of the present preferred embodiment of the invention will become further apparent upon consideration of the following description taken in conjunction with the accompanying drawings, wherein:

FIG. 1 is a cross-sectional view illustrating half of a portion of a removable tread belt tire, according to the invention;

FIG. 2A is a side view of a tread belt prepared for shipping, according to the invention;

FIG. 2B is a side view of an alternative embodiment of a tread belt prepared for shipping, according to the invention;

FIG. 3A is a side view of a tire carcass optionally prepared for shipping, according to the invention;

FIG. 3B is a cross-sectional view of a tire carcass optionally prepared for shipping, according to the invention;

FIG. 4 is a side view of a storage area for very large tires, according to the invention;

FIG. 5A is a cross-sectional view of a very large tire changing process, according to the invention; and FIG. 5B is a side view of an alternative embodiment of a very large tire changing process, according to the invention.

DEFINITIONS

"Bead" means that part of the tire comprising an annular tensile member wrapped by the ply cords and shaped, with or without other reinforcement elements such as flippers, chippers, apexes, toe guards and chafers, to fit the wheel rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about 25–50 angle with respect to the equatorial plane of the tire. Cords run at opposite angles in alternate layers.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface under load and pressure.

"Lateral" and "laterally" means lines or directions that are parallel to the axis of rotation of the tire (also "axial").

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial and "radially" means directions extending radially toward or away from the axis of rotation of the tire.

"Radial-ply tire" means a belted or circumferentially-restricted pneumatic tire in which the ply cords which extend from bead to bead are laid at cord angles between 65 degrees and 90 degrees with respect to the equatorial plane of the tire.

"Zero-degree wires" means at least one layer of parallel cords (usually metal wire), underlying the tread, unanchored to the bead, spiraling circumferentially around the tread, and having cord angles in the range from 0 degrees to 5 degrees with respect to the equatorial plane of the tire.

DETAILED DESCRIPTION OF THE INVENTION

The method of this invention requires a tread belt version of a very large tire (such as tires greater than 120 inches (3.05 meters) in diameter as used on earthmover-type very large vehicles). The method is not dependent on a particular design for the removable tread belt and matching carcass. Although a specific very large tire design is described hereinbelow for illustrating the embodiment of this inventive method, the inventive method should not be limited to this particular tire design.

FIG. 1 illustrates a cross-section of a portion of a very large tread belt pneumatic tire 10 which in the specific embodiment illustrated is a size 70/68R63 earthmover tire. The size 70/68R63 tire has a 162 inch (411.45 cm) maximum inflated outside diameter (OD), a 70.0 inch (177.80 cm) maximum inflated width in the axial direction, and a nominal bead diameter of 63 inches (160.02 cm). The tread belt 12 has a thickness (t) of approximately 10 inches (254 cm), and a width of approximately 65 inches (1,651 cm). The assembled tire 10 weighs 16,000 pounds ( 7,256 kg), of which approximately 8,000 pounds (3,628 kg) are in the removable tread belt 12. The tire carcass 14 is typically inflated to a pressure of about 100 pounds per square inch (686 kPa) with air and sometimes with an air/nitrogen mixture. The very large tread belt pneumatic tire 10 includes a ground engaging, circumferentially extending tread belt 12 mounted on a radially reinforced, beaded tire carcass 14. The beaded tire carcass 14 generally includes a pair of tire sidewalls 16 extending radially inwardly from the outer circumferential surface 20 of the tire carcass 14 and terminating at a pair of bead wires 22. The sidewalls 16 each have an upper portion 16a in the shoulder region of tire carcass 14 and radially outward of the maximum section width of the tire carcass 14, and a lower portion 16b, adjacent the bead wires 22, and radially inward of the maximum section width of the tire carcass 14.

Most details of the tire carcass 14 construction are not relevant to the method of this invention, and will not be described other than to note that the carcass 14 generally contains at least one rubberized laminated ply layer 34 of tire cord fabric. The carcass 14 mounts on the wheel mounting rim 42, pneumatically sealing in the area of the bead 22 against, and held in place by, the flange 35, which is generally removable from the rim 42 on wheels used for very large tires 10.

An optional feature is generally included in removable tread belt tires 10 in order to assist in holding the removable tread belt 12 in place on the carcass 14. This optional feature, illustrated in FIG. 1, comprises a set of one or more grooves 78 and one or more lands 76 formed in the outer circumferential surface 20 of the carcass 14.

The ground engaging, circumferentially extending tread belt 12 is removably mounted onto the tire carcass 14. At a minimum, the tire tread belt 12 comprises a tread portion 80, and at least one belt 82, 84, 86, and/or 88 (82–88) or set of zero-degree wires 90 which encircle the tire tread and are provided to restrict the radially outward growth of the tread belt 12. The placement and shape of the wires 90 and/or the belts 82–86 are the subject of other patents, and are not critical to the method of this invention.

An optional feature of the tread belt 12 embodiment illustrated in FIG. 1 comprises one or more annular lands 72 and one or more annular grooves 74 in the underside or inner circumferential surface 70 of the tread belt 12 that interlock with corresponding grooves 78 and lands 76 of the tire carcass 14 to restrain the tread belt 12 from lateral or axial movement with respect to the carcass 14.

Until the recent advent of increasingly larger "very large" pneumatic tires, there was very little perceived need for removable tread belt versions of these tires. The present invention has identified a new category of problems related to the very large tires, and provides methods for shipping, storing, and changing of very large tires which utilize removable tread belt tire designs to address the shipping, storing, and changing problems which are unique to these tires.

Method of Shipping Very Large Tires

When pneumatic tires become so large that they cannot be shipped by conventional means, the shipping method of this invention is to utilize removable tread belt tires (e.g., 10), and to ship the tire tread belt 12 separately from the tire carcass 14. Regardless of how they are prepared for shipping, the action by itself of separating the tread belt 12 from the carcass 14 produces significant shipping weight and size reductions. For the example illustrated in FIG. 1, the overall tire diameter decreases from a whole tire OD of approximately 162 inches (4.11 meters) to approximately 142 inches (3.61 meters) for the outside diameter of the tire carcass 14. Likewise, the weight of 16,000 pounds (7,256 kg) for the whole tire is separated into an approximately 8,000 pound (3,268 kg) carcass 14 and an approximately 8.000 pound (3,268 kg).

The separate tread belt 12 can be compressed into various smaller dimensions when prepared for shipping. A preferred embodiment 200 is illustrated in FIG. 2A, wherein the tread belt 12 is diametrically compressed and held in the compressed state by one or more straps 210 (210*a*, 210*b*, 210*c*, 210*d*, 210*e*) made of steel or other suitable shipping strap material such as plastic, fabric, rope, or chains. To prevent collapse of the tread belt 12 and potential damage of the belt due to overly sharp bending of the ends 212*a* and 212*b*, a spacer 220 is positioned inside the tread belt 12. The straps 210 hold the tread belt 12 compressed against diametrically-opposed sides of the spacer 220, and the spacer 220 is constructed so that the compressed shape of the tread belt 12 is preferably an elongated straight-sided oval with a height (H) to length (L) ratio of no less than 40%. This H/L ratio minimum is intended to prevent damage of the belt due to overly sharp bending of the ends 212*a* and 212*b* of the tread belt 12. The spacer 220 is constructed by known techniques and using materials suitable to support the weight and shipping forces of the tread belt 12 during shipping. For example, wood or metal constructions, or plastic pre-forms could be used, providing the spacer does not have any sharp edges which could damage a surface of the tread belt 12. The dimensions of the spacer are such as will maintain support of the tread belt 12 over approximately 40% to 70% of the compressed length L, over a minimum of 50% of the tread belt width W, and will also provide the minimum H/L ratio stated above.

For convenience in handling, the compressed tread belt 12 is preferably strapped onto a bottom pallet 230 of dimensions suitable to support at least the entire width W and at least the flat-sided length Lf of the compressed tread belt 12. The pallet 230 is constructed by known techniques and of suitable, known pallet materials, and is designed to be able to sustain expected weights and shipping forces.

A top pallet 232, similar to the bottom pallet 230, is optionally added above the compressed tread belt 12 and held in place by the straps 210. By using two pallets 230, 232 with the straps 210 encircling below the bottom pallet 230 and above the top pallet 232, the tread belt 12 is protected from damage by contact with the straps 210.

FIG. 2B illustrates an alternative embodiment 250 of a very large tire tread belt 12 prepared for shipment in a compressed state. This alternative embodiment 250 maintains 10 the same shape and overall compressed tread belt dimensions as the preferred embodiment 200, but the tread belt 12 has been placed on its side. Although a spacer 270 is still utilized inside the tread belt 12 in order to maintain the same minimum H/L ratio for the tread belt 12, the spacer 270 may be constructed with a lower strength since it is no longer bearing the weight of approximately half of a tread belt 12 above (or even more if the compressed tread belts are to be stacked). The bottom pallet 280 has a width Wp greater than or approximately equal to the height H of the compressed tread belt 12, and a length Lp which is at least the flat-sided length Lf but preferably equals the compressed length L of the compressed tread belt 12. One or more straps 260 (260*a*, 260*b*, 260*c*) encircle the tread belt 12 and the bottom pallet 280 to hold the tread belt 12 in a compressed state about the spacer 270. A top pallet 282, similar to the bottom pallet 280, is optionally added above the compressed tread belt 12 and held in place by the straps 260. By using two pallets 280, 282 with the straps 260 encircling below the bottom pallet 280 and above the top pallet 282, the tread belt 12 is protected from damage by contact with the straps 260.

FIGS. 3A and 3B illustrate an optional shipping method 300 for the very large tire carcass 14. This method is optional because the overall tire OD is significantly reduced by utilization of a removable tread belt design 10 for the very large tire according to the method of this invention. Furthermore, the amount of diametrical compression possible for a tire 10 or a tire carcass 14 is severely limited by the rigidity of the carcass sidewalls 16 and beads 22. However, if the very large tire 10 is so large that even the reduced diameter 30 of the tire carcass 14 presents problems in shipping, then the diameter of the tire carcass 14 can be somewhat further reduced by compressing it with straps 310 (310*a*, 310*b*) which are applied across a diameter of the tire carcass. As for the tread belt straps 210, 260, the straps 310 may be made of any suitable material such as steel, plastic, fabric, rope or chains. If the choice of material for the straps is considered unduly abrasive or sharp-edged, then suitable padding should be provided between the straps 310 and the tire carcass 14.

Best seen in the cross-sectional view of FIG. 3B, optional end-caps 315 may be placed between the straps 310 and the tire carcass 14. The end-caps 315 are plywood or other suitably rigid rectangular elements made of wood, plastic or metal which have a length Lc approximately equal to the flat-sided length of the compressed tire carcass 14 and a width Wc which equals or slightly exceeds the width of bulged-out sidewalls 316 (316*a*, 316*b*, 316*c*, 316*d*). Since the bead wires 22 are significantly more rigidly circular than the remainder of the tire carcass 14, when the straps 310 compress the tire carcass 14 the sidewalls 316 will tend to wrinkle, and it is preferable to allow them to bulge laterally outward relative to the tire's equatorial plane. An outward bulge is the natural direction for tire sidewall movement, and as such produces the least strain on the elements of the tire carcass 14. The end-caps 315 hold the straps 310 laterally outward away from the sidewalls 316, thereby allowing the sidewalls 316 to bulge in their most natural way in response to the diametrical compression forces exerted by the straps 310. The dimensions (Lc by Wc) of the endcaps 315, are determined empirically as they are dependent on the individual tire carcass 14 and its response to the amount of compression forces applied by the straps 310 as the straps 310 compress the tire carcass 14 to the desired shipping diameter Dc.

The shipping methods described hereinabove have been illustrated by embodiments 200, 250, 300 which incorporate straps 210, 260, 310 to hold the tread belts 12 and tire carcasses 14 in compressed states. Given the shipping methods herein described, a person skilled in the art may see alternative means of holding the tread belts 12 and tire carcasses 14 in compressed states, such as the use of a restraining box-like structure around some or all portions of one or more tread belts 12, or a restraining box-like structure around some or all portions of one or more tire carcasses 14.

Method of Storing Very Large Tires

The method of this invention includes the utilization of removable tread belt tires 10 for the very large vehicles needing very large tires at the work site. It is estimated that a well-designed very large tire carcass 14 will outlast an average of four well-designed very large tire removable tread belts 12 under typically severe operating conditions at work sites typical for very large tires (e.g., rock quarries). This implies that only one fourth as many carcasses 14 as tread belts 12 need to be stocked at the work site. Since tread belts 12 consume much less storage space than carcasses 14, the use of removable tread belt tire designs for very large tires presents significant advantages in storage. These advantages carry over into inventory cost savings and shipping cost savings as well, since tread belts 12 are less costly to both purchase and ship compared to carcasses 14 and to conventional very large tires.

The space-saving/cost-saving ratio of tread belts 12 to carcasses 14 (or to conventional tires) is further improved if the work site requires different tread designs for different driving conditions. Where it may have been impractical with conventional tires, the use of removable tread tires 10 allows a job site to stock additional tread belts 12 of different designs for the same number of carcasses 14 in stock, thereby making the carcasses 14 into multi-purpose carcasses which can be used to form a variety of very large tires 10 for multiple purposes.

FIG. 4 illustrates the method 400 of storing very large removable tread belt tires 10 in an exemplary storage area for a work site. There are a relatively small number of tire carcasses 414, and a relatively large number of tread belts 412 (412a,412b,412c,412d, 412e). Some of the tread belts 412a are stored as they were shipped. Other tread belts 412b. 412e have been stockpiled in loosely compressed states. The tread belts 412 have different tread patterns. For example, normal-width tread belts 412b,412c have cleat designs for operation on gravel or in dry weather dirt conditions. The tread belt 412e has a wider tread with deep cleats for muddy conditions such as in rainy weather. The wider tread belt 412e is designed to fit on the same carcass 414 as the other tread belts 412. The tread belt 412d has a tread pattern suitable for a steering tire instead of a driving tire.

Method of Changing Very Large Tires

Utilizing very large removable tread belt tires 10 for the very large vehicles at a work site, according to the method of this invention, makes the process of changing tires significantly more cost effective. When conventional very large tires are used, a first tire on a wheel must be removed from the very large vehicle, the first tire must then be removed from the wheel and replaced with a second tire, and then the second tire on the wheel must be replaced on the very large vehicle. This tire changing process typically requires as much as 5 to 6 hours for a single tire change.

FIG. 5A illustrates an embodiment 500 of an improved tire-changing process according to this invention which utilizes removable tread belt tires 10 and requires approximately 1 hour for a tread belt change. The time (and cost) savings of this method 500 assumes that only the tread belt requires changing, as is usually the case, particularly for well-designed very large tread belt tires 10 which include tread belt 12 design features which protect the carcass from puncture and cuts, and carcass 14 design features which enhance the durability of the carcass under extreme loading and flexure conditions. If the carcass has been damaged or worn out, then a time-consuming conventional tire changing method will be required to change the carcass 14. For well-designed very large removable tread belt tires 10, it is estimated that at least 3 out of 4 tire changes will only require a change of the tread belt 12.

In the embodiment 500 of the very large tire changing method of this invention, the tire 510 having a first tread belt 512a which is to be changed must be positioned so that the first tread belt 512a is removed from contact with a load bearing surface such as the ground 537. In this example, an appropriate portion of the very large vehicle 525 is raised on a jack 539 (e.g., a pneumatic jack). Next, the tire carcass 514 holding the first tread belt 512a to be changed is at least partially deflated until the first tread belt 512a becomes loose about the tire carcass 514. Next, the first tread belt 512a is laterally removed from the tire carcass 514 using any suitable non-damaging tools and techniques (e.g., pry bars, hooks, chains, ropes). As illustrated in FIG. 5A, one or more chains 533 (533a, 533b) are attached to the first tread belt 512a and lateral force is applied by, for example, hand or lift truck (neither shown). The preferred method would be to pull one portion of the first tread belt 512a off first (e.g., the portion closest to the ground 537), and then to pull or peel off the remaining portions of the first tread belt 512a.

The replacement second tread belt 512b can now be laterally moved onto the tire carcass 514. This is preferably accomplished using a crane or lift truck (neither shown) to raise the top portion of the second tread belt 512b to the level of the top of the carcass 514 and immediately adjacent to the carcass 514. Using suitable tools, including for example attachments to the lift truck (not shown), the top portion of the second tread belt 512b is laterally moved (e.g., pushed) onto the top of the carcass 514. As the top portion of the second tread belt 512b is laterally moved, the remainder of the second tread belt 512b can be pushed to follow the lateral movement of the top portion of the second tread belt 512b until the entire second tread belt 512b can be correctly positioned circumferentially around the outer circumferential surface 20 of the tire carcass 514. Such correct positioning includes aligning the laterally outside edges of the second tread belt 512b with the laterally outside edges of the upper portions 16a of the sidewalls 16 of the carcass 514; and also includes aligning and interlocking any grooves 74, 78 and any corresponding lands 72, 76 (if present) in the interlocking circumferential surfaces 70, 20 of the second tread belt 512b and the tire carcass 514.

Finally, the tire carcass 514 is preferably inflated to its proper inflation pressure, and is inflated at least enough to cause the second tread belt 514b inner circumferential surface 70 to conform closely to the outer circumferential surface 20 of the tire carcass 514. The very large tire change is complete, and the very large vehicle can be placed back in service by lowering it to the ground 537, such as by lowering and removing the pneumatic jack 539.

FIG. 5B illustrates an alternate embodiment 550 of an improved tire-changing process according to this invention which also utilizes removable tread belt tires 10 and requires less equipment than the method of the first embodiment 500. As in the first embodiment 500, significant time and cost savings of the alternative embodiment 550 are possible in the estimated majority of situations where only the tread belt 12 needs to be changed.

The alternative method eliminates the need for raising the very large vehicle 525. The first step of the tire changing process now becomes partially deflating the tire carcass 514 until the first tread belt 512a becomes loose about the tire carcass 514. Next, the step of laterally removing the first tread belt 512a from the tire carcass 514 using suitable tools is modified to include laterally removing at least a forward portion 512a1 of the first tread belt 512a (for example pulling with chain 533a1) and then essentially "driving" the carcass 14 out of the first tread belt 512a. The "driving out" process comprises rolling the tire carcass 514 in a forward direction 561 (moving the very large vehicle 525 in a forward direction 563) while applying lateral force (e.g., with one or more chains 533a1) to at least the forward portion 512a1 of the first tread belt 512a in a removing direction 565, thereby causing the first tread belt 512a to spiral off the rolling tire carcass 514. The driving out process concludes when the first tread belt 512a has spiraled off so far that the tire carcass 514 is resting on the load-bearing surface 537 (e.g., the ground) without any portion of the first tread belt 512a between the tire carcass 514 and the load-bearing surface 537. At this point the very large vehicle 525 motion 563 can be halted, and then remaining portions (if any) of the first tread belt 512a can be laterally removed from the tire carcass 514.

Next, the step of laterally moving the second (replacement) tread belt 512b onto the tire carcass 514 using suitable tools is modified to include "driving into" the second tread belt 512b, i.e., reversing the removal process of the previous step of the alternative method 550. Using suitable means such as a lift truck with pushing attachments (not shown) the second tread belt 512b is lifted up and pushed onto the top portion of the tire carcass 514 so that the second tread belt 512b is draped over, and at least partly supported by, at least part of the top portion 514a2 of the tire carcass 514; and the second tread belt 512b is also pushed and/or pivoted so that at least a portion of the second tread belt 512b overlaps part of the forward portion 514a1 of the tire carcass 514. Now the tire carcass 514 can be "driven into" the second tread belt 512b by rolling the tire carcass 514 in a forward direction 561 (moving the very large vehicle 525 in a forward direction 563) while applying lateral force to at least the forward portion 512a1 of the second tread belt 512b in an applying direction 566, thereby causing the second tread belt 512b to spiral onto the rolling tire carcass 514. The driving into process concludes when the second tread belt 512b has spiraled on so far that the tire carcass 514 is resting on the second tread belt 512b which is between the tire carcass 514 and the load-bearing surface 537 (e.g., the ground) without any portion of the tire carcass 514 in contact with the load-bearing surface 537, and with the second tread belt 512b close to being in correct position on the tire carcass 514 at the bottom portion 514a3 of the tire carcass 514. Because of the spiraling action of the second tread belt 512b, the circumferential plane of the second tread belt 512b may still be at a slight angle to the circumferential plane of the tire carcass 514, therefore while the tire carcass 514 continues to roll, appropriate portions of the second tread belt 512b should now be pushed or pulled laterally in ways which cause it to twist into alignment of the two circumferential planes, at least where the second tread belt 512b contacts the ground. It may help to steer the very large vehicle 525 in a way which causes the tire carcass 514 to pivot into the second tread belt 512b. At this point the very large vehicle 525 motion 563 can be halted, and then remaining portions (if any) of the second tread belt 512b can be laterally moved onto and aligned with the tire carcass 514, so that the second tread belt 512b is correctly positioned on the tire carcass 514. Subsequently inflating the tire carcass 514 to its proper inflation pressure completes the alternative embodiment 550 of the inventive method of tire changing for very large tires.

Due to the relative ease of the inventive methods of storing and changing tread belts 12 for very large tires 10, this invention makes it feasible to change tread belts 12 to utilize different tread designs (e.g., as on tread belts 412b, 412c,412d, 412e) to accommodate different operating conditions such as different load-bearing surface 537 conditions (e.g., as caused by changes in environmental conditions: wet/dry, summer/winter, mud/snow/dry), or such as different applications of the very large vehicles 525 (e.g., usage on gravel, dirt, sand, rough terrain or paved roadway, high speed driving, low speed driving).

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of changing a tread belt of a large tread belt tire mounted on a vehicle, the large tread belt tire comprising an inflatable tire carcass having one or more lands and grooves in an outer circumferential surface of the carcass and a removable tread belt mounted on the tire carcass, the tread belt having an inner circumferential surface which conforms closely to the outer circumferential surface of the tire carcass when the tire carcass is inflated, the tread belt having one or more annular grooves in the inner circumferential surface that interlock with corresponding one or more lands and grooves of the carcass to restrain the tread belt from lateral or axial movement with respect to the carcass; the method of changing the tread belt including steps of:

at least partially deflating the tire carcass while mounted on the very large vehicle so that a first tread belt having a first inner circumferential surface is loosely mounted on the at least partially deflated tire carcass;

removing the first tread belt from the at least partially deflated tire carcass by laterally pulling the first tread belt away from the tire carcass; the step of removing the first tread belt from the at least partially deflated tire carcass including laterally removing in a removing direction at least a portion of the first tread belt from at least a forward portion of the tire carcass, which is not in contact with a load bearing surface;

rolling the tire carcass on a load bearing surface while applying lateral force to the first tread belt in the removing direction until the tire carcass is partially free of the first tread belt and the tire carcass rests on a load-bearing surface without any portion of the first tread belt between the tire carcass and the load-bearing surface;

laterally removing the remaining portions of the first tread belt from the tire carcass;

laterally positioning a second tread belt having a second inner circumferential surface with one or more annular grooves in the second inner circumferential surface that interlock with the corresponding one or more lands and grooves of the carcass to restrain the second tread belt from lateral or axial movement with respect to the carcass onto the at least partially deflated tire carcass circumferentially around the outer circumferential surface of the tire carcass; and inflating the tire carcass to cause the second inner circumferential surface of the second tread belt to conform closely to the outer circumferential surface of the tire carcass.

2. Method of claim 1, wherein the step of positioning the second tread belt includes the steps of:

laterally moving at least a portion of the second tread belt onto at least a forward portion of the tire carcass which is not in contact with the load bearing surface;

rolling the tire carcass while applying lateral force to the second tread belt in an applying direction at least until at least a portion of the tire carcass is positioned on the second tread belt so that the second tread belt is between the tire carcass and the load-bearing surface; and laterally moving the remaining portions of the second tread belt in the applying direction onto the tire carcass.

3. Method of claim 2, including the step of:

positioning the vehicle so that the first tread belt is removed from contact with a load-bearing surface prior to removing the first tread belt from the tire carcass.

4. Method of claim 3, including the step of:

positioning the vehicle so that the second tread belt is in contact with a load-bearing surface and the tread belt tire is bearing a load after the second tread belt is mounted to the tread tire.

5. Method of claim 1, wherein the step of positioning the second tread belt includes the steps of:

laterally moving at least a portion of the second tread belt onto at least a forward portion of the tire carcass which is not in contact with a load bearing surface;

rolling the tire carcass while applying lateral force to the second tread belt in an applying direction at least until at least a portion of the tire carcass is positioned on the second tread belt so that the second tread belt is between the tire carcass and the load-bearing surface; and laterally moving the remaining portions of the second tread belt in the applying direction onto the tire carcass.

6. Method of claim 1, including the step of:

positioning the vehicle so that the first tread belt is removed from contact with a load-bearing surface prior to removing the first tread belt from the tire carcass.

7. Method of claim 6, including the step of:

positioning the vehicle so that the second tread belt is in contact with a load-bearing surface and the tread belt tire is bearing a load after the second tread belt is mounted to the tread tire.

* * * * *